United States Patent
Stephens

(10) Patent No.: US 11,896,909 B2
(45) Date of Patent: Feb. 13, 2024

(54) EXPERIENCE-BASED PEER RECOMMENDATIONS

(71) Applicant: SONY INTERACTIVE ENTERTAINMENT LLC, San Mateo, CA (US)

(72) Inventor: Mischa Stephens, San Mateo, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 16/358,546

(22) Filed: Mar. 19, 2019

(65) Prior Publication Data

US 2020/0188796 A1 Jun. 18, 2020

Related U.S. Application Data

(63) Continuation-in-part of application No. 16/220,465, filed on Dec. 14, 2018, now abandoned.

(51) Int. Cl.
*A63F 13/795* (2014.01)
*A63F 13/34* (2014.01)
*H04L 67/104* (2022.01)

(52) U.S. Cl.
CPC .......... *A63F 13/795* (2014.09); *A63F 13/34* (2014.09); *A63F 2300/408* (2013.01);
(Continued)

(58) Field of Classification Search
CPC .. A63F 13/43; A63F 13/795; A63F 2300/408; A63F 2300/556;
(Continued)

(56) References Cited

U.S. PATENT DOCUMENTS

| 5,913,013 A | 6/1999 | Abecassis |
|---|---|---|
| 8,448,095 B1 | 5/2013 | Haussila et al. |

(Continued)

FOREIGN PATENT DOCUMENTS

| CN | 113710337 | 11/2021 |
|---|---|---|
| CN | 113710340 | 11/2021 |

(Continued)

OTHER PUBLICATIONS

PCT Application No. PCT/US2019/062626 International Search Report and Written Opinion dated Jan. 29, 2020.

(Continued)

*Primary Examiner* — Seng H Lim
(74) *Attorney, Agent, or Firm* — Polsinelli LLP

(57) ABSTRACT

A system and method for providing peer recommendations in a network environment are provided. A set of activity data and user generated content (UGC) associated with the set of activity data may be stored in memory in a database. Such UGC may depict the activity. The set of activity data may be received regarding an activity that a user and at least one peer have participated in simultaneously on the network environment. Corresponding UGC may also be received. A user-peer indication may be identified based on identifying a peer with whom the user experienced a significant event during the activity. Such significant event may be based on one or more event factors. A peer recommendation may be generated based on the peer indication and such peer recommendation at least a portion of the UGC associated with the significant even may be provided to the user.

22 Claims, 4 Drawing Sheets

(52) U.S. Cl.
CPC . *A63F 2300/556* (2013.01); *A63F 2300/5566* (2013.01); *H04L 67/104* (2013.01)

(58) Field of Classification Search
CPC .. A63F 2300/5566; A63F 13/34; A63F 13/86; A63F 13/87; H04L 67/104
USPC .......................................................... 463/7
See application file for complete search history.

(56) References Cited

U.S. PATENT DOCUMENTS

| | | | |
|---|---|---|---|
| 8,460,108 | B2 | 6/2013 | Hendrickson et al. |
| 8,764,555 | B2 | 7/2014 | Quan et al. |
| 8,918,728 | B2 | 12/2014 | Hamilton et al. |
| 9,155,963 | B2 | 10/2015 | Baynes et al. |
| 9,168,460 | B2 | 10/2015 | Pearce |
| 9,333,433 | B2 | 5/2016 | Cotter |
| 9,381,425 | B1 | 7/2016 | Curtis et al. |
| 9,468,851 | B1 | 10/2016 | Pieron |
| 9,795,879 | B2 | 10/2017 | Colenbrander |
| 10,109,003 | B1 | 10/2018 | Jenkins et al. |
| 10,564,820 | B1 | 2/2020 | Cabanero et al. |
| 10,569,164 | B1 | 2/2020 | Bleasdale-Shepherd |
| 10,843,085 | B2 | 11/2020 | Stephens |
| 10,848,805 | B1 | 11/2020 | Mattar et al. |
| 10,881,962 | B2 | 1/2021 | Stephens |
| 11,080,748 | B2 | 8/2021 | Stephens |
| 11,090,568 | B1 | 8/2021 | Mattar et al. |
| 11,213,748 | B2 | 1/2022 | Jarzebinski |
| 11,247,130 | B2 | 2/2022 | Stephens |
| 11,269,944 | B2 | 3/2022 | Stephens |
| 11,420,130 | B2 | 8/2022 | Clingman |
| 11,442,987 | B2 | 9/2022 | Clingman |
| 11,465,053 | B2 | 10/2022 | Stephens |
| 11,602,687 | B2 | 3/2023 | Clingman |
| 2002/0077170 | A1* | 6/2002 | Johnson ................... G07F 17/32 463/16 |
| 2002/0183105 | A1 | 12/2002 | Cannon et al. |
| 2004/0021684 | A1 | 2/2004 | Millner |
| 2007/0198740 | A1 | 8/2007 | Peters et al. |
| 2007/0198939 | A1 | 8/2007 | Gold |
| 2008/0045335 | A1 | 2/2008 | Garbow et al. |
| 2008/0262858 | A1* | 10/2008 | Broady ................... G06Q 30/02 705/1.1 |
| 2009/0115776 | A1 | 5/2009 | Bimbra et al. |
| 2009/0170609 | A1* | 7/2009 | Kang ....................... A63F 13/12 463/43 |
| 2009/0176557 | A1 | 7/2009 | Hall et al. |
| 2009/0197681 | A1* | 8/2009 | Krishnamoorthy .... G06Q 30/02 463/42 |
| 2009/0276713 | A1 | 11/2009 | Eddy |
| 2010/0070613 | A1 | 3/2010 | Chen et al. |
| 2010/0105484 | A1 | 4/2010 | Horneff et al. |
| 2010/0304348 | A1 | 12/2010 | Lehavi |
| 2011/0067061 | A1 | 3/2011 | Karaoguz et al. |
| 2011/0092282 | A1 | 4/2011 | Gary |
| 2011/0113149 | A1* | 5/2011 | Kaal ....................... H04L 67/104 709/231 |
| 2011/0250971 | A1 | 10/2011 | van Os et al. |
| 2011/0314029 | A1 | 12/2011 | Fischer et al. |
| 2011/0319229 | A1 | 12/2011 | Corbalis et al. |
| 2012/0004956 | A1* | 1/2012 | Huston ............... G06Q 30/0241 705/14.1 |
| 2012/0030123 | A1 | 2/2012 | Ocko |
| 2012/0094762 | A1 | 4/2012 | Khan |
| 2012/0115580 | A1 | 5/2012 | Homik et al. |
| 2012/0206574 | A1 | 8/2012 | Shikata et al. |
| 2012/0252583 | A1 | 10/2012 | Mikkelsen |
| 2012/0284292 | A1 | 11/2012 | Rechsteiner et al. |
| 2012/0309533 | A1 | 12/2012 | Horita et al. |
| 2012/0317198 | A1 | 12/2012 | Patton et al. |
| 2012/0322561 | A1 | 12/2012 | Kohlhoff |
| 2013/0064527 | A1 | 3/2013 | Maharajh et al. |
| 2013/0084969 | A1 | 4/2013 | Knoles et al. |
| 2013/0086484 | A1 | 4/2013 | Antin et al. |
| 2013/0165234 | A1* | 6/2013 | Hall ....................... A63F 13/00 463/42 |
| 2013/0190094 | A1 | 7/2013 | Ronen et al. |
| 2013/0212342 | A1 | 8/2013 | McCullough et al. |
| 2013/0244785 | A1 | 9/2013 | Gary |
| 2014/0012922 | A1 | 1/2014 | Wu |
| 2014/0080601 | A1 | 3/2014 | Knutsson |
| 2014/0179440 | A1 | 6/2014 | Perry |
| 2014/0199045 | A1 | 7/2014 | Lee et al. |
| 2014/0204014 | A1 | 7/2014 | Thorn et al. |
| 2014/0206456 | A1 | 7/2014 | Koplar |
| 2014/0228112 | A1* | 8/2014 | Laakkonen ........... A63F 13/497 463/31 |
| 2014/0235338 | A1 | 8/2014 | Hansson et al. |
| 2014/0243097 | A1 | 8/2014 | Yong et al. |
| 2014/0243098 | A1 | 8/2014 | Yong et al. |
| 2014/0274297 | A1 | 9/2014 | Lewis et al. |
| 2014/0364210 | A1 | 12/2014 | Murray et al. |
| 2015/0026728 | A1 | 1/2015 | Carter et al. |
| 2015/0081777 | A1* | 3/2015 | Laine ................... H04N 21/854 709/203 |
| 2015/0094139 | A1 | 4/2015 | Kargar |
| 2015/0142799 | A1 | 5/2015 | Eronen et al. |
| 2015/0224396 | A1* | 8/2015 | Okada ................... A63F 13/497 463/24 |
| 2015/0245084 | A1 | 8/2015 | Downing et al. |
| 2015/0296250 | A1 | 10/2015 | Casper |
| 2015/0306499 | A1 | 10/2015 | Chimes et al. |
| 2015/0331856 | A1 | 11/2015 | Choi et al. |
| 2015/0381689 | A1 | 12/2015 | Ganesh et al. |
| 2016/0005326 | A1 | 1/2016 | Syrmis et al. |
| 2016/0029153 | A1 | 1/2016 | Linn et al. |
| 2016/0078471 | A1 | 3/2016 | Hamedi |
| 2016/0147890 | A1 | 5/2016 | Wissner et al. |
| 2016/0149956 | A1 | 5/2016 | Birnbaum et al. |
| 2016/0277349 | A1 | 9/2016 | Bhatt et al. |
| 2016/0287997 | A1 | 10/2016 | Laakkonen et al. |
| 2016/0350813 | A1 | 12/2016 | Balasubramanian et al. |
| 2016/0366483 | A1 | 12/2016 | Joyce et al. |
| 2017/0001011 | A1 | 1/2017 | Willette et al. |
| 2017/0001122 | A1 | 1/2017 | Leung et al. |
| 2017/0050111 | A1 | 2/2017 | Perry et al. |
| 2017/0087460 | A1 | 3/2017 | Perry |
| 2017/0126757 | A1 | 5/2017 | Kuo et al. |
| 2017/0157512 | A1 | 6/2017 | Long et al. |
| 2017/0188116 | A1 | 6/2017 | Major et al. |
| 2017/0189815 | A1 | 7/2017 | Tweedale et al. |
| 2017/0246544 | A1 | 8/2017 | Agarwal et al. |
| 2017/0301041 | A1 | 10/2017 | Schneider |
| 2017/0339093 | A1 | 11/2017 | Pesavento et al. |
| 2017/0354888 | A1 | 12/2017 | Benedetto et al. |
| 2018/0001194 | A1 | 1/2018 | Sherwani et al. |
| 2018/0001216 | A1* | 1/2018 | Bruzzo ................... A63F 13/33 |
| 2018/0014077 | A1 | 1/2018 | Hou et al. |
| 2018/0021684 | A1 | 1/2018 | Benedetto |
| 2018/0033250 | A1 | 2/2018 | O'Heeron et al. |
| 2018/0101614 | A1 | 4/2018 | Kuipers et al. |
| 2018/0126279 | A1 | 5/2018 | Stelovsky et al. |
| 2018/0192142 | A1 | 7/2018 | Paul |
| 2018/0295175 | A1 | 10/2018 | Smith et al. |
| 2018/0302761 | A1* | 10/2018 | Rizzolo ............... H04L 12/1822 |
| 2018/0318708 | A1 | 11/2018 | Rom et al. |
| 2018/0343505 | A1 | 11/2018 | Loheide et al. |
| 2018/0359477 | A1 | 12/2018 | Yang |
| 2019/0052471 | A1 | 2/2019 | Panattoni et al. |
| 2019/0208242 | A1 | 7/2019 | Bates et al. |
| 2019/0246149 | A1 | 8/2019 | Reza et al. |
| 2019/0282906 | A1 | 9/2019 | Yong |
| 2019/0297376 | A1 | 9/2019 | McCarty et al. |
| 2020/0061465 | A1 | 2/2020 | Benedetto et al. |
| 2020/0101382 | A1 | 4/2020 | Wheeler et al. |
| 2020/0111306 | A1 | 4/2020 | Oberberger et al. |
| 2020/0114267 | A1 | 4/2020 | Sakurai |
| 2020/0147489 | A1 | 5/2020 | Mahlmeister et al. |
| 2020/0169793 | A1 | 5/2020 | Akerfeldt |
| 2020/0184041 | A1 | 6/2020 | Andon et al. |
| 2020/0188781 | A1 | 6/2020 | Stephens |
| 2020/0188792 | A1 | 6/2020 | Stephens |
| 2020/0188794 | A1 | 6/2020 | Stephens |

(56) References Cited

U.S. PATENT DOCUMENTS

| | | |
|---|---|---|
| 2020/0188800 A1 | 6/2020 | Stephens |
| 2020/0192929 A1 | 6/2020 | Stephens |
| 2020/0193476 A1 | 6/2020 | Stephens |
| 2020/0193477 A1 | 6/2020 | Stephens |
| 2021/0077907 A1 | 3/2021 | Stephens |
| 2021/0129023 A1 | 5/2021 | Jarzebinski |
| 2021/0370169 A1 | 12/2021 | Clingman |
| 2021/0370185 A1 | 12/2021 | Clingman |
| 2021/0374180 A1 | 12/2021 | Clingman |
| 2022/0088474 A1 | 3/2022 | Dicken et al. |
| 2022/0143516 A1 | 5/2022 | Thielbar |
| 2022/0193546 A1 | 6/2022 | Jarzebinski |
| 2022/0401845 A1 | 12/2022 | Clingman |

FOREIGN PATENT DOCUMENTS

| | | | |
|---|---|---|---|
| CN | 113727764 | 11/2021 | |
| CN | 113727765 | 11/2021 | |
| CN | 114599432 | 6/2022 | |
| CN | 116457066 A | 7/2023 | |
| EP | 2014342 A1 | 1/2009 | |
| EP | 3894030 | 10/2021 | |
| EP | 3894031 | 10/2021 | |
| EP | 3894032 | 10/2021 | |
| EP | 4240505 | 9/2023 | |
| JP | H11179050 A | 7/1999 | |
| JP | 2009522853 A | 6/2009 | |
| JP | 2011217803 A | 11/2011 | |
| JP | 2017-182603 | 10/2017 | |
| JP | 2022-512425 | 2/2022 | |
| JP | 2022-512492 | 2/2022 | |
| JP | 2022-513485 | 2/2022 | |
| JP | 2022-513849 | 2/2022 | |
| JP | 2023-500868 | 1/2023 | |
| KR | 2018-0094833 | 8/2018 | |
| WO | WO 2009/094611 | 7/2009 | |
| WO | WO-2009094611 A2 * | 7/2009 | ............ A63F 13/63 |
| WO | WO 2014/047490 | 3/2014 | |
| WO | 2015200737 A1 | 12/2015 | |
| WO | WO 2017/182642 | 10/2017 | |
| WO | WO 2017/188677 | 11/2017 | |
| WO | WO 2020/123115 | 6/2020 | |
| WO | WO 2020/123116 | 6/2020 | |
| WO | WO 2020/123117 | 6/2020 | |
| WO | WO 2020/123118 | 6/2020 | |
| WO | WO 2021/086561 | 5/2021 | |
| WO | WO 2021/242476 | 12/2021 | |
| WO | WO 2021/242477 | 12/2021 | |
| WO | WO 2021/242478 | 12/2021 | |
| WO | WO 2022/098707 | 5/2022 | |

OTHER PUBLICATIONS

PCT Application No. PCT/US2019/062606 International Search Report and Written Opinion dated Jan. 30, 2020.
PCT Application No. PCT/US2019/062613 International Search Report and Written Opinion dated Feb. 3, 2020.
U.S. Appl. No. 16/220,460 Office Action dated Jan. 28, 2020.
U.S. Appl. No. 16/220,397, Mischa Stephens, Targeted Gaming News and Content Feeds, filed Dec. 14, 2018.
U.S. Appl. No. 16/359,160, Mischa Stephens, Targeted Gaming News and Content Feeds, filed Mar. 20, 2019.
U.S. Appl. No. 16/379,683, Mischa Stephens, Interactive Objects in Streaming Media and Marketplace Ledgers, filed Apr. 9, 2019.
U.S. Appl. No. 16/380,760, Mischa Stephens, Media-Activity Binding and Content Blocking, filed Apr. 10, 2019.
U.S. Appl. No. 16/220,443, Mischa Stephens, Interactive Objects in Streaming Media and Marketplace Ledgers, filed Dec. 14, 2018.
U.S. Appl. No. 16/220,460, Mischa Stephens, Media-Activity Binding and Content Blocking, filed Dec. 14, 2018.
U.S. Appl. No. 16/220,465, Mischa Stephens, Experience-Based Peer Recommendations, filed Dec. 14, 2018.
U.S. Appl. No. 16/220,465 Office Action dated Jun. 15, 2020.
U.S. Appl. No. 16/220,397 Office Action dated Sep. 25, 2020.
U.S. Appl. No. 16/359,160 Office Action dated Nov. 13, 2020.
U.S. Appl. No. 16/220,443 Office Action dated Oct. 19, 2020.
U.S. Appl. No. 16/379,683 Office Action dated Nov. 6, 2020.
U.S. Appl. No. 16/885,629, Dustin S. Clingman, Media-Object Binding for Displaying Real-Time Play Data for Live-Streaming Media, filed May 28, 2020.
U.S. Appl. No. 16/885,653, Dustin S. Clingman, Media-Object Binding for Predicting Performance in a Media, filed May 28, 2020.
U.S. Appl. No. 16/885,641, Dustin S. Clingman, Media-Object Binding for Dynamic Generation and Displaying of Play Data Associated With Media, filed May 28, 2020.
PCT Application No. PCT/US2019/062602 International Search Report and Written Opinion dated Feb. 14, 2020.
U.S. Appl. No. 16/380,760 Office Action dated Mar. 6, 2020.
PCT Application No. PCT/US2020/054603 International Search Report and Written Opinion dated Jan. 28, 2021.
U.S. Appl. No. 16/220,465 Final Office Action dated Dec. 24, 2020.
U.S. Appl. No. 16/359,160 Final Office Action dated Mar. 12, 2021.
U.S. Appl. No. 16/220,443 Final Office Action dated Apr. 13, 2021.
U.S. Appl. No. 16/379,683 Final Office Action dated May 7, 2021.
U.S. Appl. No. 16/679,795 Office Action dated May 10, 2021.
U.S. Appl. No. 17/102,881, Mischa Stephens, Media-Acitivty Binding and Content Blocking, filed Nov. 24, 2020.
U.S. Appl. No. 16/679,795, Alexander Jarzebinkski, Content Streaming With Gameplay Launch, filed Nov. 11, 2019.
PCT/US20/54603, Content Streaming With Gameplay Launch, Oct. 7, 2020.
Li et al., "Distributed Multimedia Systems", IEEE, Jul. 1997, retrieved on [Feb. 7, 2021]. Retrieved from the internet <URL: https://citeseerx.ist.psu.edu/viewdoc/download?doi=10.1.1.128.9759&rep1&type=pdf>.
PCT Application No. PCT/US2019/062602 International Preliminary Report on Patentability dated Jun. 8, 2021.
PCT Application No. PCT/US2019/062606 International Preliminary Report on Patentability dated Jun. 8, 2021.
PCT Application No. PCT/US2019/062613 International Preliminary Report on Patentability dated Jun. 8, 2021.
PCT Application No. PCT/US2019/062626 International Preliminary Report on Patentability dated Jun. 8, 2021.
PCT Application No. PCT/US2021/030378 International Search Report and Written Opinion dated Aug. 5, 2021.
PCT Application No. PCT/US2021/030379 International Search Report and Written Opinion dated Aug. 5, 2021.
PCT Application No. PCT/US2021/030380 International Search Report and Written Opinion dated Aug. 12, 2021.
U.S. Appl. No. 16/359,160 Office Action dated Jul. 12, 2021.
U.S. Appl. No. 16/220,443 Office Action dated Aug. 6, 2021.
U.S. Appl. No. 16/220,465 Office Action dated Jul. 26, 2021.
U.S. Appl. No. 17/566,964, Alexander Jarzebinski, Content Streaming With Gameplay Launch, filed Dec. 31, 2021.
U.S. Appl. No. 17/517,875, Christopher Thielbar, Replayable Activities for Interactive Content Titles, filed Nov. 3, 2021.
PCT/US21/57832, Replayable Activities for Interactive Content Titles, Nov. 3, 2021.
EP Application No. 19896543.6 Extended European search report dated Aug. 12, 2022.
EP Application No. 19895486.9 Extended European search report dated Oct. 5, 2022.
EP Application No. 19897134.3 Extended European search report dated Oct. 5, 2022.
PCT Application No. PCT/US2020/054603 International Preliminary Report on Patentability dated May 2, 2022.
U.S. Appl. No. 17/517,875 Office Action dated Oct. 13, 2022.
PCT Application No. PCT/US2021/057832 International Search Report and Written Opinion dated Feb. 16, 2022.
U.S. Appl. No. 16/885,635 Office Action dated Mar. 30, 2022.
EP Application No. 19896349.8 Extended European search report dated Jul. 5, 2022.
PCT Application No. PCT/US2021/030378 International Preliminary Report on Patentability dated Nov. 17, 2022.

(56) References Cited

OTHER PUBLICATIONS

PCT Application No. PCT/US2021/030379 International Preliminary Report on Patentability dated Nov. 17, 2022.
PCT Application No. PCT/US2021/030380 International Preliminary Report on Patentability dated Nov. 17, 2022.
U.S. Appl. No. 17/566,964 Office Action dated Nov. 23, 2022.
U.S. Appl. No. 18/114,482, Dustin S. Clingman, Media-Object Binding for Predicting Performance in a Media, filed Feb. 27, 2023.
U.S. Appl. No. 17/517,875 Final Office Action dated Mar. 31, 2023.
Anonymous: "New Replay and Resume Features Coming in Heart of the Swarm—StarCraft II—Blizzard News", Jan. 24, 2013 (Jan. 24, 2013), XP093053633, Retrieved from the Internet: URL:https://news.blizzard.com/en-gb/starcraft2/10054757/new-replay-and-resume-features-coming-in-heart-of-the-swarm [retrieved on Jun. 12, 2023] * pp. 3,5 *.
Chinese Application No. 201980089787.4 First Office Action dated Aug. 18, 2023.
Japanese Application No. 2021-533796 Non Final Notification of Reasons for Refusal dated Nov. 2, 2023.
Japanese Application No. 2021-533797 Non Final Notification of Reasons for Refusal dated Oct. 17, 2023.
European Application No. 20882882.2 Extended European Search Report dated Oct. 13, 2023.
U.S. Appl. No. 17/517,875 Office Action dated Oct. 31, 2023.

* cited by examiner

EXPERIENCE-BASED PEER RECOMMENDATIONS

CROSS-REFERENCE TO RELATED APPLICATION

This application is a continuation-in-part of U.S. patent application Ser. No. 16/220,465 filed Dec. 14, 2018, which is incorporated by reference herein in its entirety.

BACKGROUND OF THE INVENTION

1. Field of the Invention

The present technology pertains to peer recommendations. More specifically, the present technology may provide for experience-based peer recommendations.

2. Description of the Related Art

Social gaming experiences—whether competitive, team-based, or otherwise involving one's social network—are a popular segment of digital gameplay. Conventional social games may require a user to solicit peers to join their social gaming network or may suggest random peers with no common interest to the user. Typically, a user may want to add more peers to their social gaming network, but may not know which peers to add based on a common interest (e.g., style of gameplay, complementary skills, etc.) as such interests may not be readily available or immediately discernible.

Due to the popularity of social gaming, lack of peers or social interactions may detract from the user experience. For example, a user may want to play a multiplayer game with their peers, but the user may not know enough peers to fulfill a required minimum number of players. In another example, random selection of players for a multiplayer game may mismatch the peers to the user (e.g., peers with different skillsets, styles, etc.). Such mismatch of peers or lack of peers may discourage the user from continuing play of the multiplayer game.

There is, therefore, a need in the art for systems and methods for experience-based peer recommendations.

SUMMARY OF THE PRESENTLY CLAIMED INVENTION

Embodiments of the present invention include systems and methods for providing experience-based peer recommendations in a network environment. At least one set of activity data and user generated content (UGC) may be stored in memory in a database. Such UGC may depict an activity and the set of activity data may include data about the activity depicted by the UGC. One of the set of activity data and an associated UGC may be received. Such activity file may regard an activity that a user and at least one peer have participated in simultaneously on the network environment. A user-peer indication may be identified based that identifies a peer with whom the user experienced a significant event during the activity. Such significant event may be based on one or more event factors. A peer recommendation may be generated based on such user-peer indication and the peer recommendation and at least a portion of the UGC associated with the significant event may be provided to the user.

Various embodiments may include methods for providing peer recommendations in a network environment. Such methods may include receiving a set of activity data and user generated content (UGC) associated with the set of activity data. Such activity file may include data about an activity that a user and at least one peer have participated in simultaneously on the network environment. Such methods may include identifying a user-peer indication that identifies a peer with whom the user experienced a significant event during the activity. Such significant event may be based on one or more event factors. Such methods may include generating a peer recommendation based on the user-peer indication and providing the peer recommendation and at least a portion of the UGC associated with the significant event to the user.

Additional embodiments may include systems for providing experience-based peer recommendations. Such systems may include memory that stores at least one set of activity data and at least one user generated content (UGC). Each of the at least one UGC may be associated with one of the sets of activity data. Each set of activity data may include data about an activity. Such system may include a processor that executes instructions stored in memory. Execution of the instructions by the processor may receive a set of activity data regarding an activity that a user and at least one peer have participated in simultaneously on the network environment. Execution of the instructions by the processor may identify a user-peer indication that identifies a peer with whom the user experienced a significant event during the activity. Such significant event may be based on one or more event factors. Execution of the instructions by the processor may generate a peer recommendation based on the user-peer indication and may provide the peer recommendation and at least a portion of the UGC associated with the significant event to the user.

Further embodiments include non-transitory computer-readable storage media having embodied thereon a program executable by a processor to provide peer recommendations in a network environment.

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

Embodiments of the present invention include systems and methods for providing experience-based peer recommendations. A set of activity data and user generated content (UGC) associated with the set of activity data may be stored in a database. Such set of activity data may include data regarding an activity that a user and at least one peer participated in together over a network environment. The UGC may depict the activity. The set of activity data and UGC may be received by a server. A user-peer indication may be identified by the server that identifies a peer that the user experienced a significant event with during the activity. Such significant event may be based on one or more event factors. A peer recommendation may be generated based on the user-peer indication and the peer recommendation and at least a portion of the UGC associated with the significant even may be provided to the user.

Figure 1:
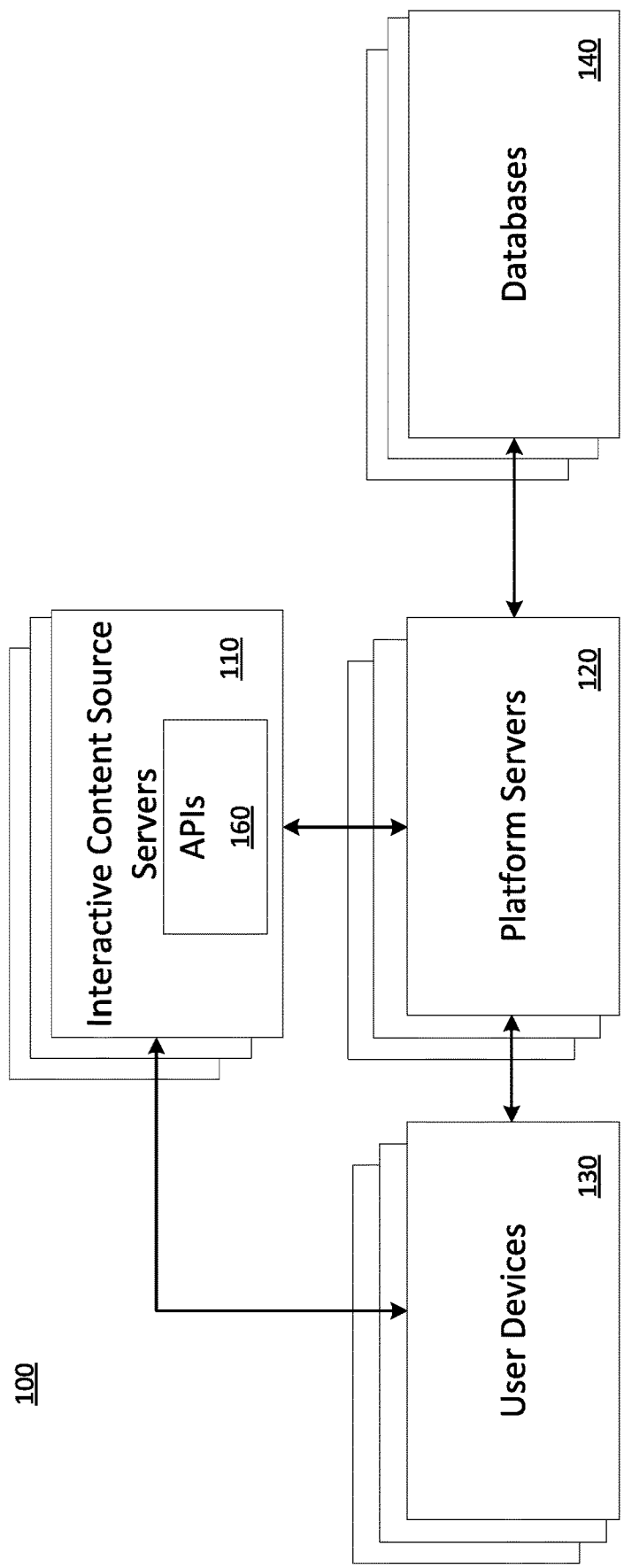
FIG. 1 illustrates an exemplary network environment in which a system for experience-based peer recommendations may be implemented.

FIG. 1 illustrates an exemplary network environment 100 in which a system for providing experience-based peer recommendations can occur. The network environment 100 may include one or more interactive content source servers 110 that provide interactive content titles (e.g., games, interactive movies, interactive digital books, etc.), platform servers 120, one or more user devices 130, and one or more databases 140.

Interactive content source servers 110 may maintain and host interactive content titles (e.g., video games, interactive books, interactive movies, etc.) available for play to a user device 140 over a communication network. Such interactive content servers 110 may be implemented in the cloud (e.g., one or more cloud servers). Each interactive content title may include one or more activities available within the content title. The one or more activities may be playable by a single user or by multiple users. In one example, the interactive content title is a video game title having different modes of competitive gameplay available within that game title. In another example, the interactive content title is another video game title having an interactive storyline for single user play. Such interactive content servers 110 may also stream and capture UGC (i.e., video, screenshots, commentary, audio, etc.) during a user and/or peer participation in an activity, though such content may also be captured and/or streamed by the platform servers 120.

The platform servers 120 may be responsible for communicating with the different interactive content servers 110, databases 140, and user devices 130. Such platform servers 120 may be implemented on one or more cloud servers. The interactive content servers 110 may communicate with multiple platform servers 120. The platform servers 120 may also carry out instructions, for example, for receiving an activity file 216, shown in FIG. 2, having data regarding an activity (e.g., a quest, storyline, competitive match, boss fight, etc.) that a user and at least one peer have participated in simultaneously on the network environment 100. The platform servers 120 may further carry out instructions, for example, for receiving a content file 212, shown in FIG. 2, associated with the activity file 216. Such content file may include UGC depicting the activity. The platform servers 120 may further carry out instructions, for identifying a user-peer indication based on the data regarding the activity. Such user-peer indication may identify a peer that the user experienced a significant event (e.g., beating a boss together, a peer saving the user's character's life, etc.) with during the activity. The platform servers 120 may further carry out instructions, for example, for providing the user-peer indication and a portion of the UGC associated with the significant event to the user.

The interactive content titles, streaming media, and corresponding activity information may be provided through an application programming interface (API) 160, which allows various types of interactive content source servers 110 to communicate with different platform servers 120 and different user devices 130. API 160 may be specific to the particular computer programming language, operating system, protocols, etc., of the interactive content source servers 110 providing the streaming media, the platform servers 120 providing the associated activity and/or object information, and user devices 130 receiving the same. In a network environment 100 that includes multiple different types of interactive content source servers 110 (or platform servers 120 or user devices 130), there may likewise be a corresponding number of APIs 160.

The user device 130 may include a plurality of different types of computing devices. For example, the user device 130 may include any number of different gaming consoles, mobile devices, laptops, and desktops. In another example, the user device 130 may be implemented in the cloud (e.g., one or more cloud servers). Such user device 130 may also be configured to access data from other storage media, such as, but not limited to memory cards or disk drives as may be appropriate in the case of downloaded services. Such devices 130 may include standard hardware computing components such as, but not limited to network and media interfaces, non-transitory computer-readable storage (memory), and processors for executing instructions that may be stored in memory. These user devices 130 may also run using a variety of different operating systems (e.g., iOS, Android), applications or computing languages (e.g., C++, JavaScript). An exemplary user device 130 is described in detail herein with respect to FIG. 4.

The databases 140 may be stored on the platform server 120, the interactive content source servers 110, any of the servers 218 (shown in FIG. 2), on the same server, on different servers, on a single server, across different servers, or on any of the user devices 130. Such databases 140 may store one or more interactive content titles. Such databases 140 may also store UGC captured during a user and/or peer participation in an activity. Such UGC may include metadata by which to search for such UGC. Such UGC may also include information about the interactive content title, user, and/or peer. Such information may be derived from data gathered during user and/or peer interaction with an activity of an interactive content title and may be "bound" to and stored with the UGC. Such binding enhances UGC as the UGC may deep link (e.g., directly launch) to an interactive content title, may provide for information about an activity and/or a peer of the UGC, and/or may allow a user to interact with the UGC.

Figure 2:
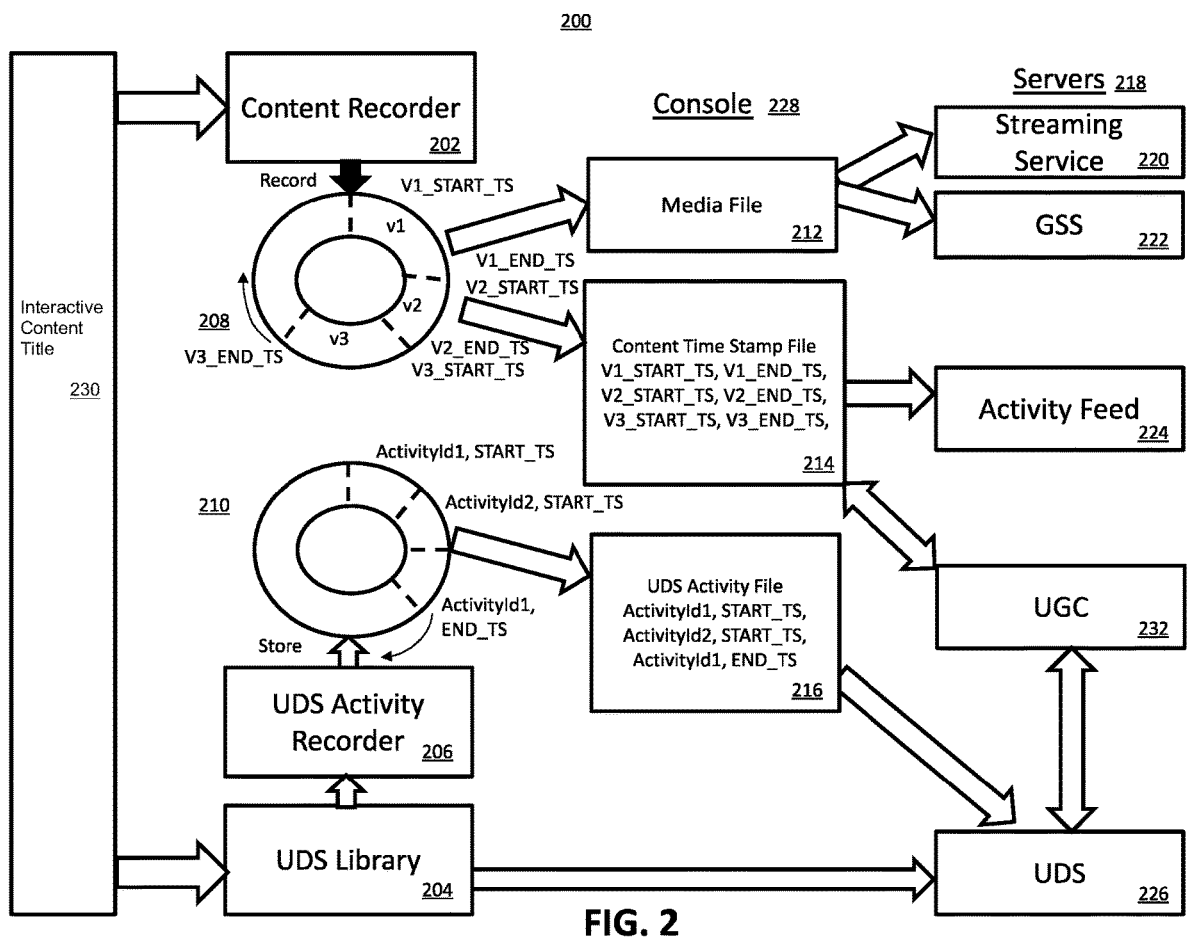
FIG. 2 illustrates a detailed exemplary network in which a system for binding data from a universal data system to user generated content may be implemented.

In the exemplary network environment 200 of FIG. 2, an exemplary console 228 (e.g., a user device 130) and exemplary servers 218 (e.g., streaming server 220, Ghost Solution Suite Server (GSS Server) 222, activity feed server 224, UGC server 232, and Universal Data Systems (UDS) server 226) are shown. In one example, the console 228 may be implemented on the platform server 120, a cloud server, or on any of the servers 218. In an exemplary example, a content recorder 202 may be implemented on the platform server 120, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 may be uploaded to the streaming server 220 and/or the GSS Server 222 for storage and subsequent streaming or use, though the media file 212 may be stored on any server, a cloud server, any console 228, or any user device 130. Such start times and end times for each segment may be stored as a content time stamp file 214 by the console 228. Such content time stamp file 214 may also include a streaming ID or GSS ID, which matches a streaming ID or GSS ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 130.

Concurrent to the content recorder 202 receiving and recording content from the interactive content title 230, a UDS library 204 receives data from the interactive content title 230, and a UDS activity recorder 206 tracks the data to determine when an activity beings and ends. The UDS library 204 and the UDS activity recorder 206 may be implemented on the platform server 120, a cloud server, or on any of the servers 218. When the UDS activity recorder 206 detects an activity beginning, the UDS activity recorder 206 receives activity data (e.g., user interaction with the activity, activity ID, activity start times, activity end times, actvity results, activity types, etc.) from the UDS library 204 and records the activity data onto a UDS ring-buffer 210 (e.g., ActivityID1, START_TS; ActivityID2, START_TS; ActivityID3, START_TS). Such activity data recorded onto the UDS ring-buffer 210 may be stored in a UDS activity file 216. Such UDS activity file 216 may also include activity start times, activity end times, an activity ID, activity results, activity types (e.g., competitive match, quest, task, etc.), user or peer data related to the activity. For example, a UDS activity file 216 may store data regarding an item used during the activity. Such UDS activity file 216 may be stored on the UDS server 226, though the UDS activity file 216 may be stored on any server, a cloud server, any console 228, or any user device 130.

Such UDS activity data (e.g., the UDS activity file 216) may be associated with the content data (e.g., the media file 212 and/or the content time stamp file 214) by the console 228 or any of the servers 218. In one example, the UGC server 232 stores and associates the content time stamp file 214 with the UDS activity file 216 based on a match between the streaming ID or GSS ID of the content time stamp file 214 and a corresponding activity ID of the UDS activity file 216. In another example, the UDS server 226 may store the UDS activity file 216 and may receive a query from the UGC server 232 for a UDS activity file 216. Such query may be executed by searching for an activity ID of a UDS activity file 216 that matches a streaming ID or GSS ID of a content time stamp file 214 transmitted with the query. In yet another example, a query of stored content time stamp files 214 may be executed by matching a start time and end time of a content time stamp file 214 with a start time and end time of a corresponding UDS activity file 216 transmitted with the query. Such UDS activity file 216 may also be associated with the matched content time stamp file 214 by the UGC server 232, though the association may be performed by any server, a cloud server, any console 228, or any user device 130. In another example, a UDS activity file 216 and a content time stamp file 214 may be associated by the console 228 during creation of each file 216, 214.

Figure 3:
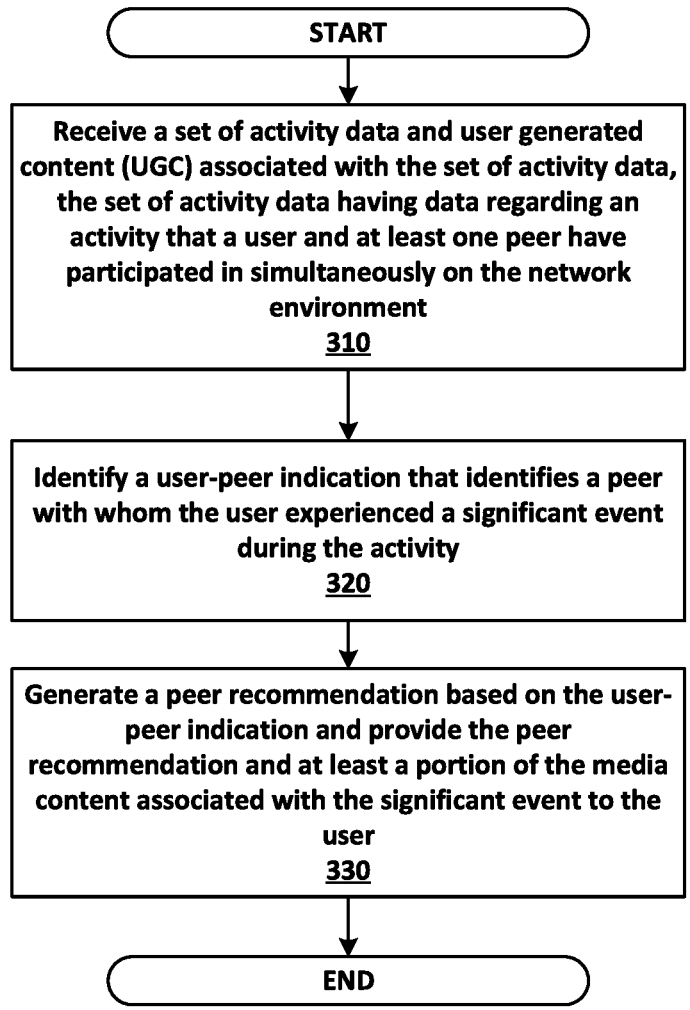
FIG. 3 is a flowchart illustrating an exemplary method for providing experience-based peer recommendations.

FIG. 3 is a flowchart illustrating an exemplary method 300 for providing experience-based peer recommendations. The method 300 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The execution of the instructions may be implemented on the cloud servers (e.g., the steps identified in FIG. 3 are performed in the cloud). The steps identified in FIG. 3 (and the order thereof) are exemplary and may include various alternatives, equivalents, or derivations thereof including but not limited to the order of execution of the same.

In step 310, a set of activity data and UGC associated with the set of activity data are received by the platform server 120 or the interactive content servers 110, though such set of activity data and UGC may be received by any server, a cloud server, any console 228, or any user device 130. Such UGC may have at least one time stamp and the set of activity data may include a corresponding at least one time stamp. Such UGC may be capture at the same time as the set of activity data and stored with the set of activity data, though the UGC may be stored elsewhere. The UGC may be generated by the user and/or peers during participation in the activity.

The set of activity data may have data regarding an activity that a user and at least one peer have simultaneously participated in on the network environment 100. Such set of activity data may include information about the activity (e.g., activity start times, activity end times, an activity ID, activity results, activity types (e.g., competitive match, quest, task, etc.), and user or peer data related to the activity). Such activity may be stored in an activity file 216 and may be part of a gaming environment.

Each set of activity data may also include a direct link to the associated activity. Such link allows a user to access an activity from UGC. For example, the user may wish to participate in an activity shown by the UGC. In the same example, the user can select an option to play the activity, and the activity may be automatically launched after selection by the user. Alternatively, the activity file may block the user from accessing the activity if the user does not own the interactive content title and may prompt the user to purchase such title.

In step 320, a user-peer indication is identified by the platform server 120 or the interactive content servers 110. Such user-peer indication may identify a peer that the user experienced a significant event with at least one peer during participation in the activity. Such significant event may be determined based on one or more event factors such as user interaction with at least one peer such, a duration of the interaction, a type of event (e.g., battling the same boss, travelling through a dungeon together, participating in a match competition, etc.), a status of the user and each peer (e.g., a quantity of health or mana of the user and/or peer's character, a skill level of the user and/or peer's character, etc.), amount and type of contribution to the event by the user and each peer (e.g., a peer leads a raid of a dungeon compared to another peer who follows, the user's character kills a boss and a peer's character continually heals the user's character, etc.), a result of the event (e.g. a peer's character saving the life of a user's character, the user discovering a rare item with help from the peer, experiencing a twist in a storyline, the user assisting with a scoring event, etc.), UGC captured (e.g., whether the user and/or peers captured UGC, when the user and/or peers captured UGC, a duration of the UGC, whether the UGC was uploaded, etc.) and conversations captured via camera, microphone, or keyboard during the event (e.g., the user thanking the peer for the peer's help or the user and/or the peer expressing emotion (i.e., laughing, exclaiming, etc.)).

Such significant event may be flagged or marked by the platform server 120. For example, a time stamp indicating a start of the significant event and another time stamp indicated an end of the significant event may be stored in the activity file 216 by the platform server 120. Such start and end of the significant event may be determined based on the one or more factors described above. For example, the start time may be flagged when the user's character health is almost fully depleted by a boss and the end time may be flagged when the user thanks the peer for saving the user's character. In another example, the start time may be flagged when a boss is almost defeated and the end time may be flagged when the boss is defeated. In yet another example, the start time and the end time may be flagged based on when UGC was captured by the user. Further, such UGC captured by the user and/or the peer during participation by the user and/or peer in the activity may be associated with the significant event by matching the start time stamp and the end time stamp of the significant event to a time stamp captured with the UGC in the content time stamp file 214.

Such user-peer indication may be further based on a relationship between the user and peer within or outside of the network environment 100. For example, a third party account (e.g., social media) of the user may indicate that the user has a relationship with the peer outside of the network environment (e.g., the user and peer are related, enrolled in the same school, have mutual friends, etc.). In another example, the user and the peer may have participated in previous activities together and/or have previously communicated with each other within the network environment 100. Such user-peer indication may also be based on similarities between the user and the peer (e.g., similar skill level, character levels, interactive content titles, geographical location, etc.) In one example, the user and peer may own the same interactive content title and/or live within a predetermined distance from each other. In yet another example, the user and peer may participate in the same types of activities across different interactive content titles, thus suggesting that the user and peer enjoy similar types of activities.

In step 330, a peer recommendation is generated based on the user-peer indication and is provided to the user by the platform server 120 or the interactive content servers 110. At least a portion of the UGC associated with the significant event is also provided to the user. Such at least the portion UGC may depict the entire significant event via a streaming video or may only show a clip or a screenshot of the significant event. In one example, such at least the portion of the UGC may be determined based on a match between a time stamp of the significant event and one of the time stamps of the UGC. In another example, such portion of the UGC may be a streaming video or a commentary having a duration. Such duration may be determined based on a match between a start time stamp and an end time stamp of the significant event and a first time stamp and a second time stamp of at least one time stamps of the UGC.

Such peer recommendation and portion of the UGC may be displayed to the user after the user and the peer have completed the activity via a separate pop up or within the interactive content title (e.g., in game), on a home screen after the user has exited the interactive content title, or after the user selects a new activity and/or a new interactive content title to participate in. Further, such peer recommendation and portion of the UGC may be displayed to the user when the user selects a new activity that is a similar type of activity as the activity that the significant event occurred in or when the user selects the same interactive content title that the significant event occurred in.

Providing at least the portion of the UGC with the peer recommendation may remind the user of the user's experience with the peer, which may incentivize the user to accept the recommendation. For example, the UGC may depict a character of the peer saving a character of the user, which may be of significance to the user. As previously described, the UGC may include a link to the activity depicted. Such link may allow the user to automatically launch the activity depicted. Such link may further send a notification and/or invitation to one or more peers depicted in the activity that the user is beginning participation in the activity. Such one or more peers may have been recommended to the user.

Such user-peer indication and portion of the UGC may be blocked by the user. Such blocking may occur if a user has selected a user setting that may block all recommendations or may block some recommendations based on certain criteria (e.g., the user and the peer do not have any mutual peers in common, the user and the peer do not have a relationship outside of the network environment 100, the peer does not have a skillset desired by the user, etc.). For example, the user may only wish to receive peer recommendations if the peer owns two or more of the same interaction content titles. In another example, the user may only wish to receive peer recommendations from peers that the user knows personally outside of the network environment 100. As such, the user may further customize identification of a peer recommendation.

Systems and methods for experience-based peer recommendations may enhance a user experience by providing targeted peer suggestions for a user to add to their selected peer list (i.e., a friends list). Providing experience-based peer recommendations filters out many peers that a user would likely not have any commonality with and presents peers that a user has already experienced a significant and/or meaningful event with. Further, experience-based peer recommendations may provide a peer that matches the user's skills and/or style and may incentivize each player to continue participation in an interactive content title or other similar title.

Figure 4:
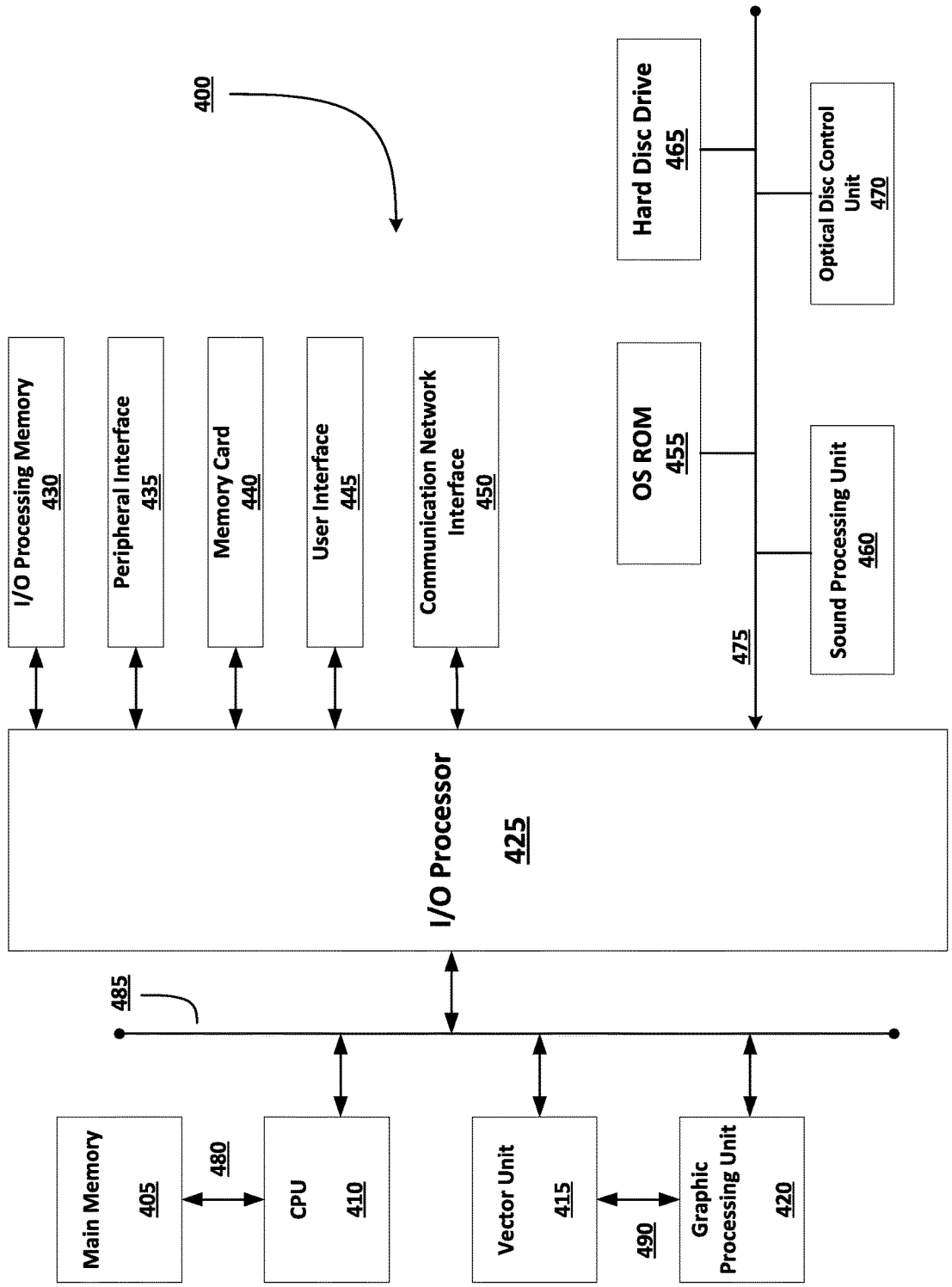
FIG. 4 is an exemplary electronic entertainment system that may be used in providing experience-based peer recommendations.

FIG. 4 is an exemplary user electronic entertainment system that may be used in providing experience-based peer recommendations. The entertainment system 400 of FIG. 4 includes a main memory 405, a central processing unit (CPU) 410, vector unit 415, a graphics processing unit 420, an input/output (I/O) processor 425, an I/O processor memory 430, a peripheral interface 435, a memory card 440, a Universal Serial Bus (USB) interface 445, and a communication network interface 450. The entertainment system 400 further includes an operating system read-only memory (OS ROM) 455, a sound processing unit 460, an optical disc control unit 470, and a hard disc drive 465, which are connected via a bus 475 to the I/O processor 425.

Entertainment system 400 may be an electronic game console. Alternatively, the entertainment system 400 may be implemented as a general-purpose computer, a set-top box, a hand-held game device, a tablet computing device, a virtual reality device, an augmented reality device, or a mobile computing device or phone. Entertainment systems may contain more or less operating components depending on a particular form factor, purpose, or design.

The CPU 410, the vector unit 415, the graphics processing unit 420, and the I/O processor 425 of FIG. 4 communicate via a system bus 485. Further, the CPU 410 of FIG. 4 communicates with the main memory 405 via a dedicated bus 480, while the vector unit 415 and the graphics processing unit 420 may communicate through a dedicated bus 490. The CPU 410 of FIG. 4 executes programs stored in the OS ROM 455 and the main memory 405. The main memory 405 of FIG. 4 may contain pre-stored programs and programs transferred through the I/O Processor 425 from a CD-ROM, DVD-ROM, or other optical disc (not shown) using the optical disc control unit 470. I/O Processor 425 of FIG. 4 may also allow for the introduction of content transferred over a wireless or other communications network (e.g., 4G, LTE, 1G, and so forth). The I/O processor 425 of FIG. 4 primarily controls data exchanges between the various devices of the entertainment system 400 including the CPU 410, the vector unit 415, the graphics processing unit 420, and the peripheral interface 435.

The graphics processing unit 420 of FIG. 4 executes graphics instructions received from the CPU 410 and the vector unit 415 to produce images for display on a display device (not shown). For example, the vector unit 415 of FIG. 4 may transform objects from three-dimensional coordinates to two-dimensional coordinates, and send the two-dimensional coordinates to the graphics processing unit 420. Furthermore, the sound processing unit 460 executes instructions to produce sound signals that are outputted to an audio device such as speakers (not shown). Other devices may be connected to the entertainment system 400 via the USB interface 445, and the communication network interface 450 such as wireless transceivers, which may also be embedded in the system 400 or as a part of some other component such as a processor.

A user of the entertainment system 400 of FIG. 4 provides instructions via the peripheral interface 435 to the CPU 410, which allows for use of a variety of different available peripheral devices (e.g., controllers) known in the art. For example, the user may instruct the CPU 410 to store certain game information on the memory card 440 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method of providing peer recommendations, the method comprising:
    recording one or more files in memory regarding online interactions in an online environment accessible over a communication network, the recorded files including activity files that include a set of activity data and one or more corresponding user generated content (UGC) files associated with the set of activity data, wherein the recorded activity files include searchable data relating to the activity;
    flagging a peer interaction event recorded within at least one of the activity files based on one or more event factors regarding the online interactions in the online environment between a user device of the user and a user device of a flagged peer, wherein the one or more event factors include an amount of contribution by the user device of the user and by the user device of the flagged peer to the peer interaction event;
    retrieving a corresponding one of the UGC files from memory based on a search term matching a portion of the searchable data of the at least one activity file;
    generating a display of a portion of the retrieved UGC file and a link selectable to launch an interactive session between the user device of the user and the user device of the flagged peer associated with the flagged event recorded in the at least one activity file, the link included in the at least one activity file; and
    launching the interactive session between the user device of the user and the user device of the flagged peer in response to the link being activated, wherein the launched interactive session is based on the retrieved UGC file.

2. The method of claim 1, wherein the activity occurs within an in-game environment of a game title.

3. The method of claim 2, wherein the flagged peer interaction event is one of a boss fight, match competition, and quest.

4. The method of claim 1, wherein the UGC is one of a streaming video, commentary, and screenshot.

5. The method of claim 1, wherein flagging the peer interaction event is further based on a third-party account of the user indicating that the user has a pre-existing relationship with the flagged peer.

6. The method of claim 1, wherein the peer interaction event is among one or more peer interaction events, and wherein a recommendation relating to another peer has been blocked by the user.

7. The method of claim 6, wherein the blocking is based on criteria regarding the user and the other peer, wherein the criteria include having no mutual peers in common.

8. The method of claim 1, wherein the one or more event factors includes at least one of user interaction with at least one peer, a duration of the interaction, a type of peer interaction event, a status of the user and each peer, amount and type of contribution to the peer interaction event by the user and each peer, a result of the peer interaction event, UGC captured, and conversations between the user and the at least one peer captured via camera, microphone, or keyboard during the peer interaction event.

9. The method of claim 1, further comprising identifying the portion of the UGC associated with the flagged peer interaction event based on a match between a time stamp of the flagged peer interaction event and at least one time stamp of the portion of the UGC.

10. The method of claim 1, further comprising determining a duration of the portion of the UGC based on a start time stamp and an end time stamp of the flagged peer interaction event matching up to a first time stamp and a second time stamp of the portion of the UGC.

11. A system for providing peer recommendations, the system comprising:
   a recorder that records one or more files in memory regarding online interactions in an online environment accessible over a communication network, the recorded files including activity files that include a set of activity data and one or more corresponding user generated content (UGC) files associated with the set of activity data, wherein the recorded activity files include searchable data relating to the activity; and
   a processor that executes instructions stored in memory, wherein execution of the instructions by the processor:
      flags a peer interaction event recorded within at least one of the activity files based on one or more event factors regarding the online interactions in the online environment between a user device of the user and a user device of a flagged peer, wherein the one or more event factors include an amount of contribution by the user device of the user and by the user device of the flagged peer interaction event;
      retrieves a corresponding one of the UGC files from memory based on a search term matching a portion of the searchable data of the at least one activity file;
      generates a display of a portion of the retrieved UGC file and a link selectable to launch an interactive session between the user device of the user and the user device of the flagged peer associated with the flagged event recorded in the at least one activity file, the link included in the at least one activity file; and
      launching the interactive session between the user device of the user and the user device of the flagged peer in response to the link being activated, wherein the launched interactive session is based on the retrieved UGC file.

12. The system of claim 11, wherein the activity occurs within an in-game environment of a game title.

13. The system of claim 12, wherein the flagged peer interaction event is one of a boss fight, match competition, and quest.

14. The system of claim 11, wherein the UGC is one of a streaming video, commentary, and screenshot.

15. The system of claim 11, wherein the processor executes further instructions to flag the peer interaction event is further based on a third-party account of the user indicating that the user has a pre-existing relationship with the flagged peer.

16. The system of claim 11, wherein the peer interaction event is among one or more peer interaction events, and wherein a recommendation relating to another peer has been blocked by the user.

17. The system of claim 16, wherein the blocking is based on criteria regarding the user and the other peer, wherein the criteria include having no mutual peers in common.

18. The system of claim 11, wherein the one or more event factors includes at least one of user interaction with at least one peer, a duration of the interaction, a type of peer interaction event, a status of the user and each peer, amount and type of contribution to the peer interaction event by the user and each peer, a result of the peer interaction event, UGC captured, and conversations between the user and the at least one peer captured via camera, microphone, or keyboard during the peer interaction event.

19. The system of claim 11, wherein the processor executes further instructions to identify the portion of the UGC associated with the flagged peer interaction event based on a match between a time stamp of the flagged peer interaction event and at least one time stamp of the portion of the UGC.

20. The system of claim 11, wherein the processor executes further instructions to identify a duration of the portion of the UGC based on a start time stamp and an end time stamp of the flagged peer interaction event matching up to a first time stamp and a second time stamp of the portion of the UGC.

21. A non-transitory computer-readable storage medium having embodied thereon a program executable by a processor to provide a method of providing peer recommendations, the method comprising:
   recording one or more files in memory regarding online interactions in an online environment accessible over a communication network, the recorded files including activity files that include a set of activity data and one or more corresponding user generated content (UGC) files associated with the set of activity data, wherein the recorded activity files further include searchable data relating to the activity;
   flagging a peer interaction event recorded within at least one of the activity files based on one or more event factors regarding the online interactions in the online environment between a user device of the user and a user device of a flagged peer, wherein the one or more event factors include an amount of contribution by the user device of the user and by the user device of the flagged peer to the peer interaction event;
   retrieving a corresponding one of the UGC files from memory based on a search term matching a portion of the searchable data of the at least one activity file;
   generating a display of a portion of the retrieved UGC file and a link selectable to launch an interactive session between the user device of the user and the user device of the flagged peer associated with the flagged event recorded in the at least one activity file, the link included in the at least one activity file; and
   launching the interactive session between the user device of the user and the user device of the flagged peer in response to the link being activated, wherein the launched interactive session is based on the retrieved UGC file.

22. The method of claim 1, wherein launching the interactive session includes launching a gaming environment of the activity when the link is activated, and sending the flagged peer one or more invitations to join the activity in the launched gaming environment.

\* \* \* \* \*